April 9, 1940. S. T. ATTARIAN 2,196,620
HOOK ATTACHING DEVICE AND SPREADER
Filed Oct. 25, 1938
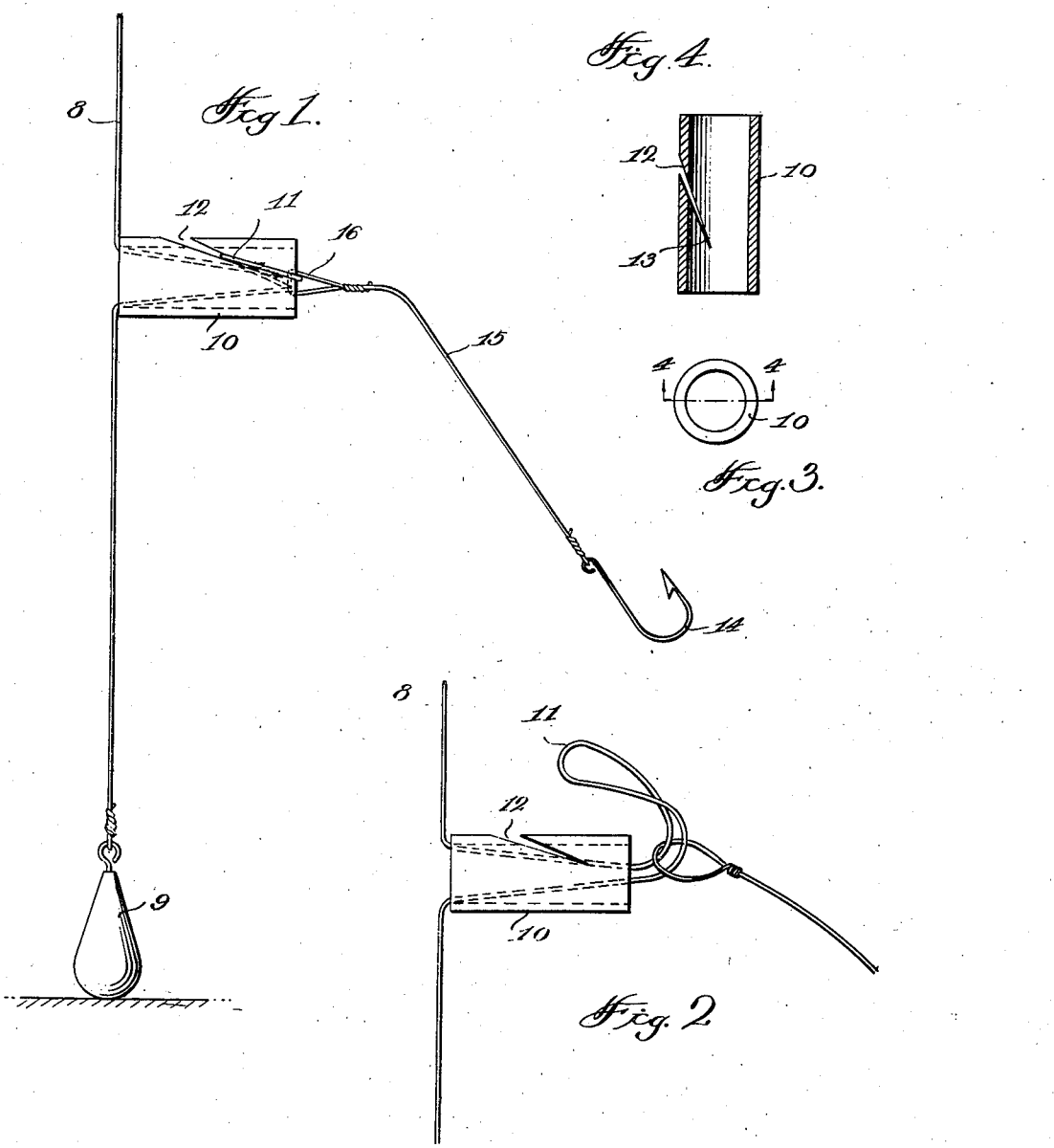
Sarkis T. Attarian
INVENTOR
BY Victor J. Evans & Co.
ATTORNEYS Patented Apr. 9, 1940

2,196,620

UNITED STATES PATENT OFFICE 2,196,620

HOOK ATTACHING DEVICE AND SPREADER

Sarkis T. Attarian, Brooklyn, N. Y.

Application October 25, 1938, Serial No. 236,927

1 Claim. (Cl. 43—28)

The present invention relates to a hook attaching device and a spreader especially designed for use as a connecting member between the hook and line.

The primary object of the invention resides in the provision of a connecting member which permits convenient attachment and removal of a hook from a line and at the same time maintaining the hook at right angles to the line thereby minimizing the entanglement of the line.

A further object of the invention resides in the provision of a connecting member having a diagonally disposed slot in one wall thereof, which slot is substantially V-shaped whereby looped portions of fishing lines of various thicknesses can be securely held therein.

The invention will be fully and comprehensively understood from a consideration of the following detailed description when read in connection with the accompanying drawing which forms a part of the application.

In the drawing:

Figure 1 is a side elevational view of a portion of a fishing line showing the new and improved connecting member attaching a hook to the line;

Figure 2 is a side elevational view of the connecting member and illustrating the method of attaching and detaching a hook to the line;

Figure 3 is a top plan view of the connecting member detached from the line; and Figure 4 is a sectional view of the connecting member and taken substantially on line 4—4 of Figure 3.

Referring to the drawing for a more detailed description thereof wherein there is illustrated the preferred embodiment of the invention, a conventional fishing line is indicated generally by the numeral 8 supporting at one end thereof a lead sinker or the like 9 in the usual manner. As is well known, it is customary to attach one or more hooks to the line and to position the same intermediate thereof and preferably above the lead sinker. The means for accomplishing this purpose includes a connecting member 10 preferably formed of a light weight material such as aluminum, Bakelite or the like. The member 10 is substantially cylindrical shaped and the interior thereof is hollow forming a passageway for receiving the looped portion 11 of the line 8 for attaching a hook thereto in a manner to be hereinafter described.

As clearly illustrated in the drawing, the connecting member 10 is formed with a slot 12 extending diagonally of said member and tapering inwardly into a substantially V-shaped formation 13. In the formation of the slot, the upper or open end is substantially wider than the tapered end to permit the use of various thicknesses of fishing lines. The line will be frictionally held within a portion of the formed slot, the edges of which are preferably rounded so as to alleviate the possibility of severing the line.

When using the connecting member for attaching a hook to a line, the intermediate portion of the line is formed with a loop 11, which loop is threaded through the hollow passageway of the connecting member. The fishing hook 14 has attached thereto a flexible line 15, the upper end of which is formed with a loop 16. The loop 16 of the hook carrying line is then positioned over the looped portion 11 of the line 8 and said looped portion 11 is then positioned within the slot 12 and a pulling motion on each end of the line 8 will draw the looped portion 16 within the connecting member and simultaneously therewith tighten the looped portion 11 within the slot 12. When so positioned the connecter 10 is securely attached to the line 8 thereby forming a connection for the hook 14 and maintaining it at right angles to the line. The hook can be readily removed by pulling lightly on the loop 16 with the left hand while grasping the connecter in the right hand, thus causing a slack in the line so that the looped end 11 may be detached from the hook 14.

From the above description it is readily apparent that there has been provided a connecting member which will efficiently and effectively permit attachment of a hook to a line and maintain it at a desired distance from the line. Thus the member 10 acts as a connecter and a spreader and if desired a plurality of the connecting members can be attached to the line when desiring to use two or more single hooks thereon.

Also it will be understood, of course, by those skilled in the art that variations in the hereinabove described device involving the substitution of substantial equivalents for the devices described are intended to be comprehended within the spirit of the present invention and that the invention is capable of extended application and is not confined to the exact showing of the drawing nor to the precise construction described and, therefore, such changes and modifications may be made therein as do not affect the spirit of the invention nor exceed the scope thereof as expressed in the appended claim.

What is claimed is:

A new and improved article of manufacture comprising, a connecter for fishing lines and hooks, said connecter being substantially cylindrical shaped and having a passageway therethrough for receiving the fishing line and to position the connecter at substantially right angles to the line, said line having a looped portion intermediate the ends thereof for carrying the loop of a fish hook carrying line, said connecter being formed with a slot in a portion of a side wall thereof extending within the passageway and tapering downwardly into a substantially V-shaped opening, whereby looped portions of fishing lines of various thicknesses can be securely held therein.

SARKIS T. ATTARIAN.